United States Patent
Hong et al.

(10) Patent No.: US 11,260,913 B2
(45) Date of Patent: Mar. 1, 2022

(54) FRONT PILLAR STRUCTURE FOR VEHICLE

(71) Applicants: Hyundai Motor Company, Seoul (KR); Kia Motors Corporation, Seoul (KR)

(72) Inventors: Deok Hwa Hong, Suwon-si (KR); Hee Seouk Chung, Hwaseong-si (KR); Byeong Cheon Lee, Seoul (KR); Hyun Sik Kim, Seoul (KR)

(73) Assignees: Hyundai Motor Company, Seoul (KR); Kia Motors Cornoration, Seoul (KR)

(*) Notice: Subject to any disclaimer, the term of this patent is extended or adjusted under 35 U.S.C. 154(b) by 176 days.

(21) Appl. No.: 16/588,358

(22) Filed: Sep. 30, 2019

(65) Prior Publication Data

US 2020/0317272 A1    Oct. 8, 2020

(30) Foreign Application Priority Data

Apr. 3, 2019    (KR) .......................... 10-2019-0039169

(51) Int. Cl.
*B62D 25/04* (2006.01)
*B62D 25/08* (2006.01)
*B62D 25/02* (2006.01)
*B62D 21/15* (2006.01)

(52) U.S. Cl.
CPC .......... *B62D 25/04* (2013.01); *B62D 25/081* (2013.01); *B62D 21/15* (2013.01); *B62D 25/025* (2013.01); *B62D 25/08* (2013.01); *B62D 25/082* (2013.01)

(58) Field of Classification Search
CPC ...... B62D 25/04; B62D 25/081; B62D 25/08; B62D 21/15; B62D 25/025; B62D 25/082
USPC ..................................................... 296/193.06
See application file for complete search history.

(56) References Cited

U.S. PATENT DOCUMENTS

| | | | |
|---|---|---|---|
| 6,293,617 B1 | 9/2001 | Sukegawa | |
| 6,447,052 B2* | 9/2002 | Saeki ..................... | B62D 21/15 |
| | | | 296/187.09 |
| 8,382,195 B2* | 2/2013 | Iwase .................. | B62D 25/025 |
| | | | 296/187.12 |

FOREIGN PATENT DOCUMENTS

| | | |
|---|---|---|
| JP | 3677979 B2 | 8/2005 |
| JP | 2017056787 A | 3/2017 |
| KR | 20150065038 A | 6/2015 |
| KR | 20170112034 A | 10/2017 |

* cited by examiner

*Primary Examiner* — D Glenn Dayoan
*Assistant Examiner* — Dana D Ivey
(74) *Attorney, Agent, or Firm* — Slater Matsil, LLP

(57) ABSTRACT

A front pillar structure for a vehicle includes a front pillar including a front pillar lower extending vertically and a front pillar upper extending obliquely from the front pillar lower. A connection member is coupled to a bottom end of the front pillar lower and connects a front side member and a side sill. The front pillar lower has an S-shaped cross section and the connection member has stepwise flanges coupled to the bottom end of the front pillar lower.

20 Claims, 18 Drawing Sheets

FRONT PILLAR STRUCTURE FOR VEHICLE

CROSS-REFERENCE TO RELATED APPLICATIONS

This application claims priority to Korean Patent Application No. 10-2019-0039169, filed in the Korean Intellectual Property Office on Apr. 3, 2019, which application is hereby incorporated herein by reference.

TECHNICAL FIELD

The present disclosure relates to a front pillar structure for a vehicle.

BACKGROUND

A pair of front side members are spaced apart from each other in a width direction of a vehicle on the front side of the vehicle. Side sills are connected to the front side members, respectively, and front pillars (i.e., A-pillars) are connected to front ends of the side sills, respectively.

To prevent deformation of the front pillars protecting a passenger compartment in the event of a frontal impact, a plurality of members, reinforcements, and the like are provided to support stiffness of the front pillars. A fender is connected to the front end of the front pillar so that an impact load may be transmitted to the front pillar through the fender during the frontal impact. In addition, heavy components such as a hood and front doors may be mounted to the front pillars using a plurality of mounting members and reinforcing members.

In a conventional front pillar structure, the plurality of mounting members and reinforcing members are mounted on the front pillars, which increase the weight and manufacturing cost of the front pillar structure.

In addition, the conventional front pillar structure does not include any impact absorption structure other than the front pillar when a tire hits the front pillar in the event of a frontal impact. Thus, the front pillar may easily be deformed due to the impact load.

The above information described in this background section is provided to assist in understanding the background of the inventive concept, and may include any technical concept which is not considered as the prior art that is already known to those skilled in the art.

SUMMARY

The present disclosure relates to a front pillar structure for a vehicle. Some embodiments relate to a front pillar structure for a vehicle capable of uniformly distributing impact energy generated during an impact of a vehicle, and reducing the weight and manufacturing cost thereof.

Embodiments can solve some or all of the problems occurring in the prior art while advantages achieved by the prior art are maintained intact.

An aspect of the present disclosure provides a front pillar structure for a vehicle capable of uniformly distributing or absorbing an impact load generated during a frontal impact of a vehicle, and reducing the weight and manufacturing cost thereof.

According to an aspect of the present disclosure, a front pillar structure for a vehicle may include a front pillar including a front pillar lower extending vertically, and a front pillar upper extending obliquely from the front pillar lower. A connection member is coupled to a bottom end of the front pillar lower, and connecting a front side member and a side sill. The front pillar lower may have an S-shaped cross section, and the connection member may have stepwise flanges coupled to the bottom end of the front pillar lower.

The front pillar lower may include a first sidewall which is recessed toward an interior space of the vehicle, and a second sidewall which protrudes toward an exterior space of the vehicle.

The front pillar lower may further include a front wall facing the front of the vehicle, a rear wall facing the rear of the vehicle, a center wall located between the front wall and the rear wall. The first sidewall may connect the front wall and the center wall, and the second sidewall may connect the center wall and the rear wall.

The front pillar lower may include a first cavity which is defined by the front wall, the first sidewall, and the center wall, and a plurality of first reinforcing ribs may be provided in the first cavity.

The front pillar lower may include a second cavity which is defined by the center wall, the second sidewall, and the rear wall, and a plurality of second reinforcing ribs may be provided in the second cavity.

The front pillar lower may include a first mounting portion which protrudes from an outboard side surface of the front pillar lower toward an exterior space of the vehicle.

The front pillar lower may include a second mounting portion to which the connection member is coupled.

The front pillar lower may include a third mounting portion, and the third mounting portion may include a plurality of bosses and a rib vertically connecting the bosses.

The stepwise flanges of the connection member may include a front flange extending in a width direction of the vehicle, a first intermediate flange which is orthogonal to the front flange, a second intermediate flange which is orthogonal to the first intermediate flange, and a rear flange which is orthogonal to the second intermediate flange.

The first intermediate flange and the rear flange may extend in a longitudinal direction of the vehicle, the first intermediate flange and the rear flange may be parallel to each other, and the second intermediate flange may be orthogonal to the first intermediate flange and the rear flange.

The front pillar lower may include an extension portion extending toward the front of the vehicle, and the extension portion may be coupled to a fender member.

A cross-sectional area of the extension portion may gradually increase from a front end of the extension portion to a rear end of the extension portion.

The extension portion may have a mounting portion on a top surface thereof, and the mounting portion may be supported by a plurality of vertical ribs.

The front pillar lower may have a mounting rib on which a cowl member is mounted, and the mounting rib may have an L-shaped cross section.

An outer member may be attached to an outboard side of the connection member, and a rear end of the outer member may be coupled to a front wall of the front pillar lower.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
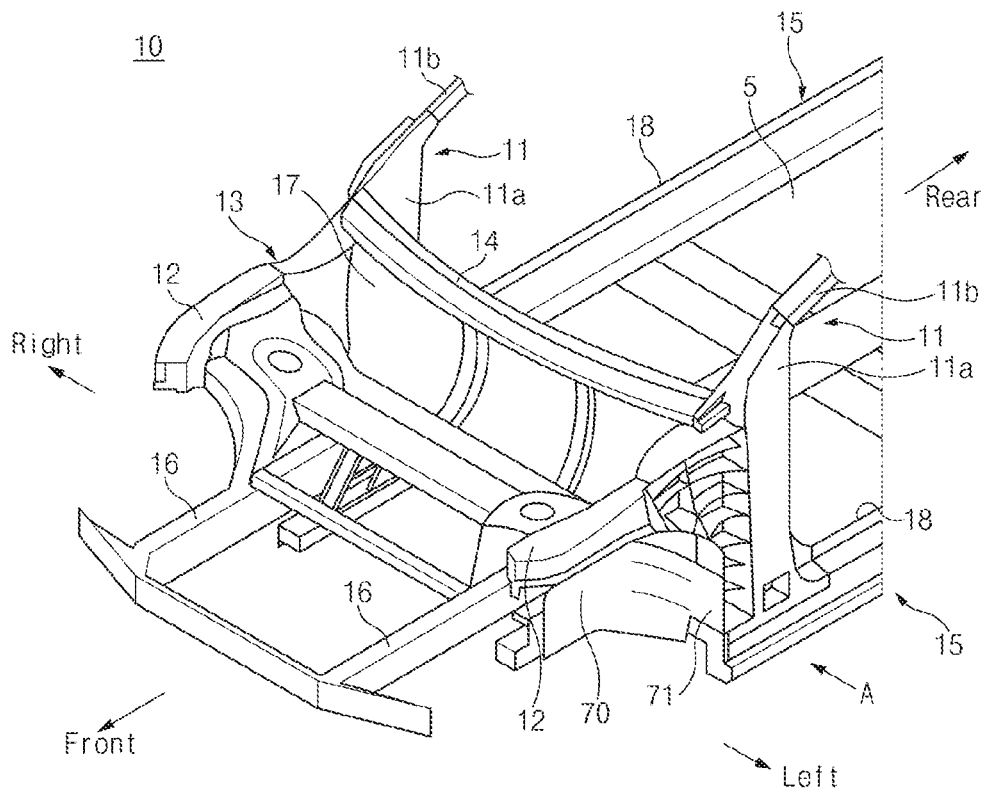
FIG. 1 illustrates a perspective view of a front pillar structure for a vehicle according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

In this description, the term "inboard side" refers to a direction toward an interior space of a vehicle, and the term "outboard side" refers to a direction toward an exterior space of the vehicle.

Figure 2:
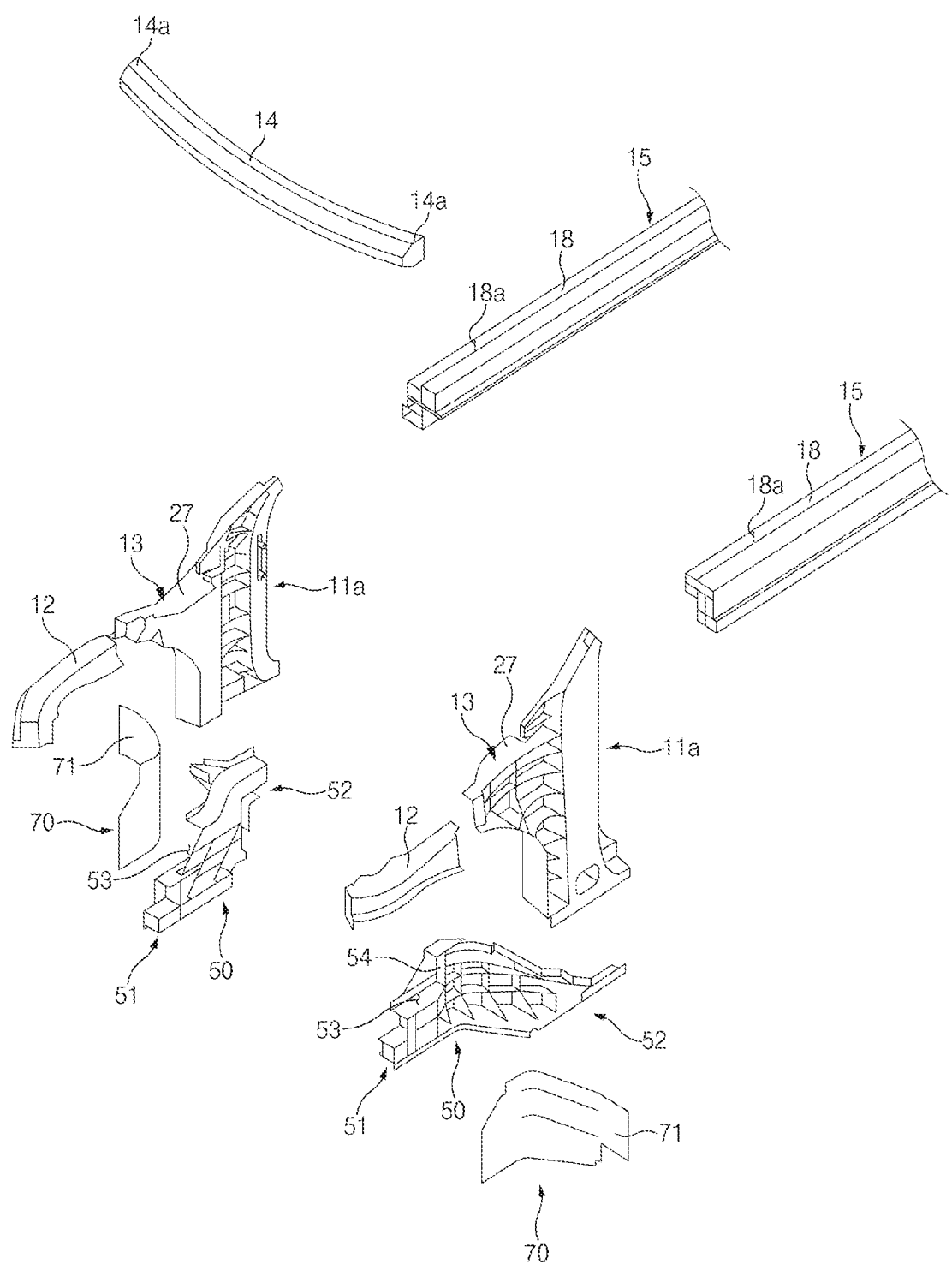
FIG. 2 illustrates an exploded perspective view of a front pillar structure for a vehicle according to an exemplary embodiment of the present disclosure.
Figure 3:
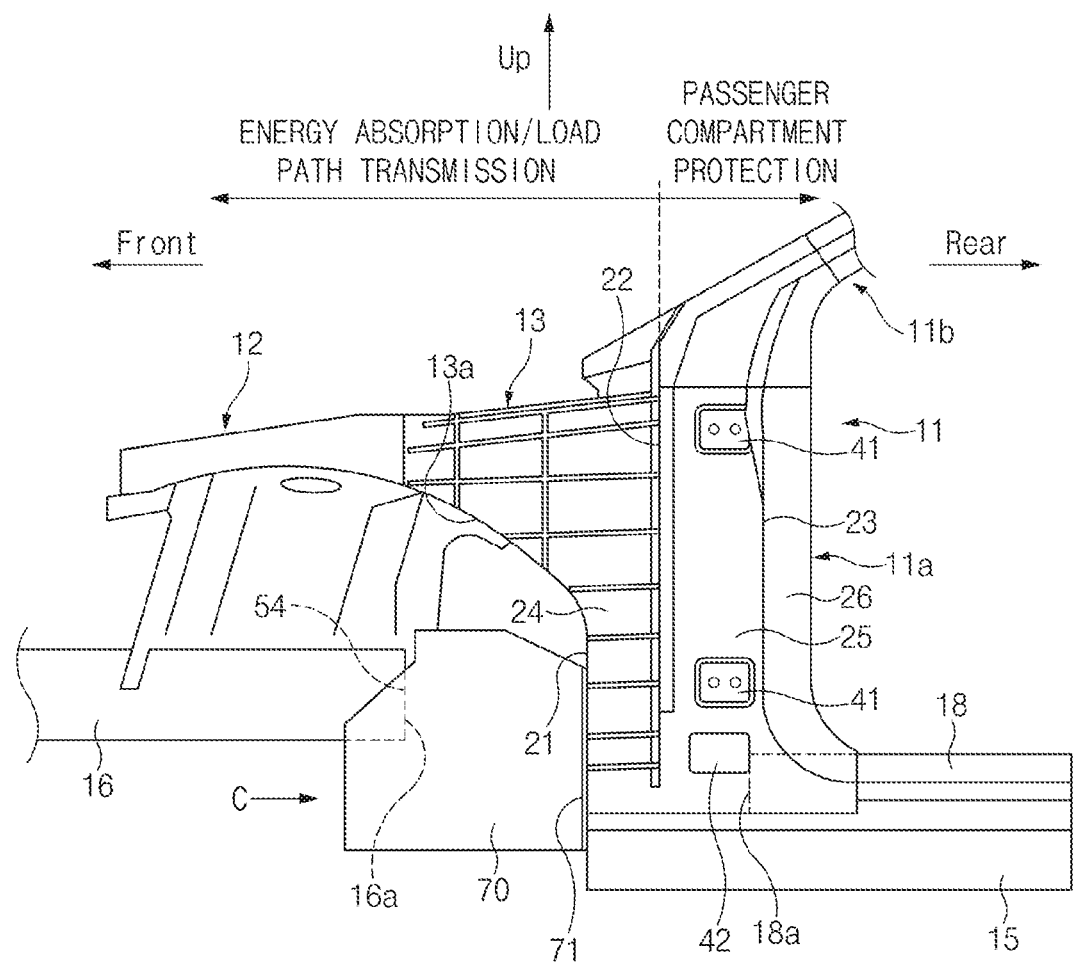
FIG. 3 illustrates a view in a direction of arrow A of FIG. 1.

Referring to FIGS. 1 to 3, a front pillar structure 10 for a vehicle, according to an exemplary embodiment of the present disclosure, may include a pair of front pillars 11 spaced apart from each other in a width direction of a vehicle on the front side of the vehicle.

Each front pillar 11 may include a front pillar lower 11a extending in a vertical direction of the vehicle, and a front pillar upper 11b extending obliquely upward from a top end of the front pillar lower 11a toward the rear of the vehicle.

The front pillar lower 11a may have an extension portion 13 extending toward the front of the vehicle. In particular, the extension portion 13 may extend as one continuous piece from a front end of the front pillar lower 11a to a rear end of a fender member 12. The front pillar lower 11a and the extension portion 13 may be formed as a unitary one-piece structure by casting and/or the like. A front end of the extension portion 13 may be coupled to the rear end of the fender member 12 by using fasteners, welding, and/or the like, and a rear end of the extension portion 13 may be integrally connected to the front end of the front pillar lower 11a. As the extension portion 13 extends from the front end of the front pillar lower 11a to the rear end of the fender member 12, the extension portion 13 may perform a role (or function) of a rear portion of an existing fender member. Thus, the fender member 12 may have a reduced size compared to the existing fender member, whereby the weight and material cost of the fender member may be reduced. In particular, the rear portion of the fender member 12 may be integrally connected to the front end of the front pillar lower 11a so that structural stiffness and functionality of the front pillar lower 11a may be improved.

Figure 13:
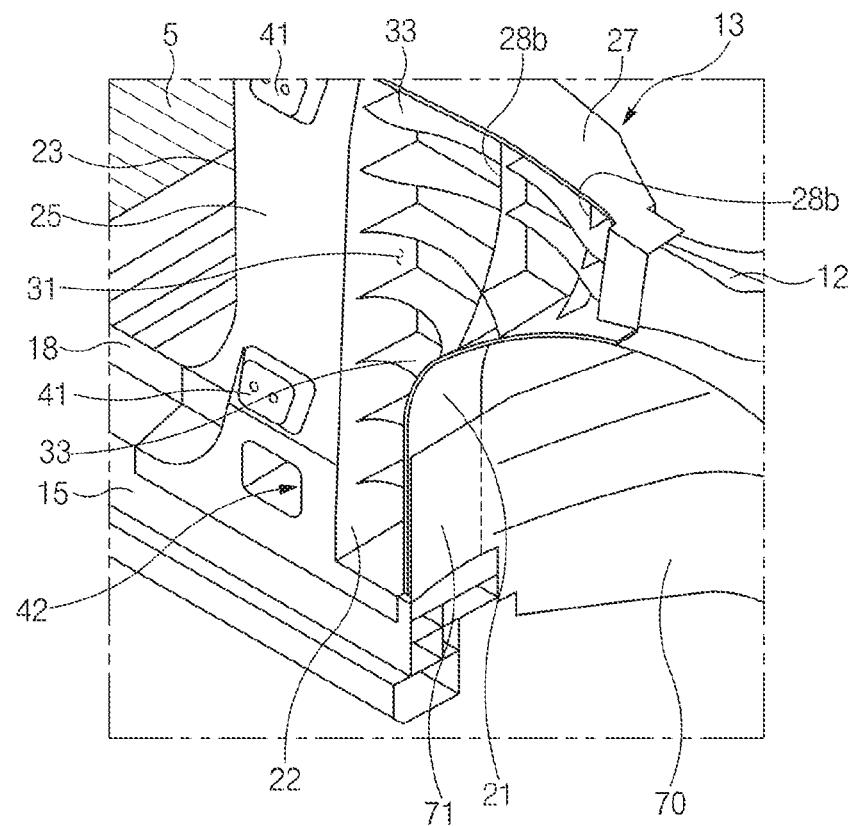
FIG. 13 illustrates a front pillar structure for a vehicle according to an exemplary embodiment of the present disclosure, in which a front pillar lower and an outer member are coupled.
Figure 14:
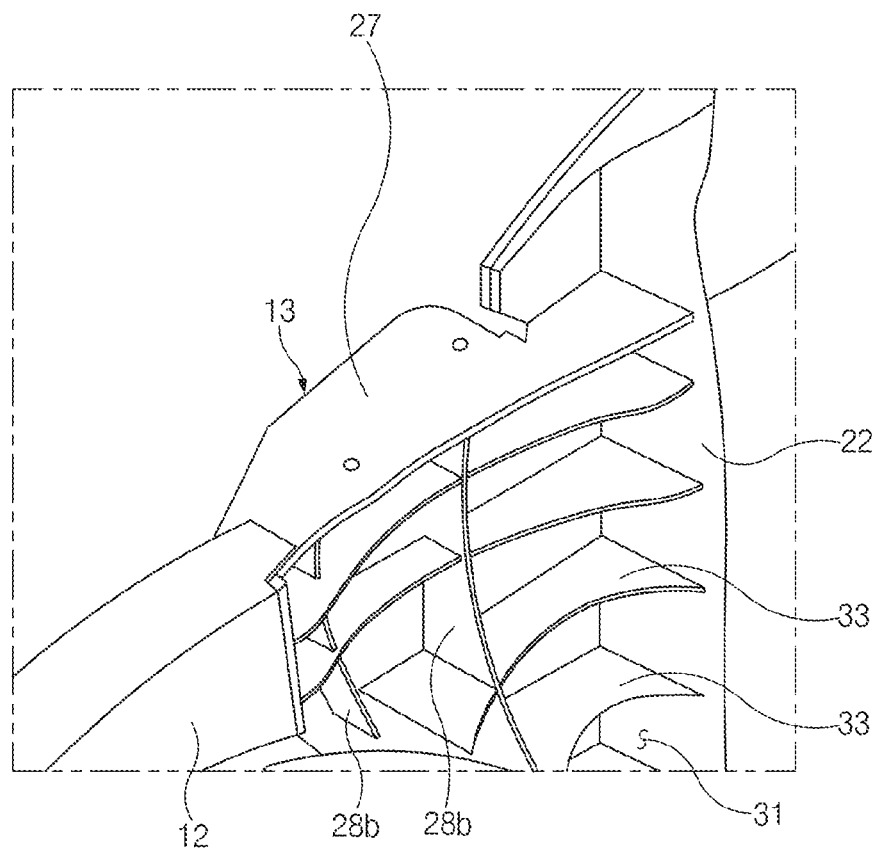
FIG. 14 illustrates a mounting portion of an extension portion in a front pillar structure for a vehicle according to an exemplary embodiment of the present disclosure, which is viewed from the outboard side of the vehicle.
Figure 15:
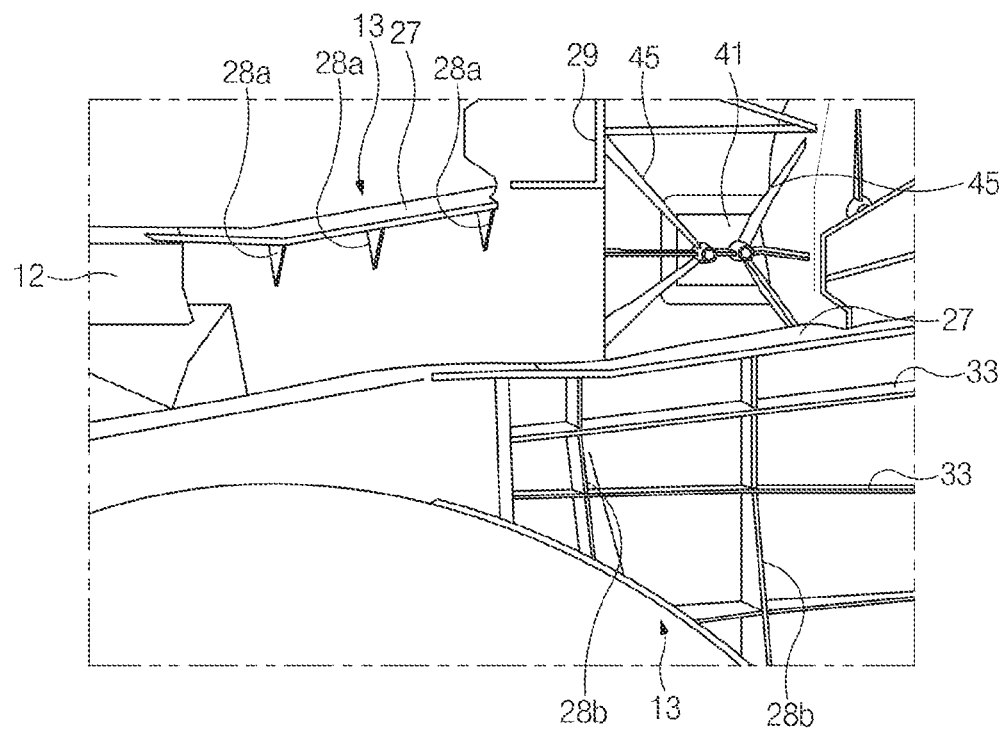
FIG. 15 illustrates a perspective view of a mounting portion of an extension portion in a front pillar structure for a vehicle according to an exemplary embodiment of the present disclosure.

The extension portion 13 may have an inboard side surface facing the interior space of the vehicle, and an outboard side surface facing the exterior space of the vehicle. Referring to FIGS. 13 to 15, the extension portion 13 may have a mounting portion 27 formed on a top surface thereof on which a hood hinge is mounted, and the mounting portion 27 may be a structure having a flat surface or even surface. The mounting portion 27 may be supported by a plurality of vertical ribs 28a and 28b. The plurality of vertical ribs 28a and 28b may include a plurality of first vertical ribs 28a (see FIG. 15) formed on the inboard side surface of the extension portion 13, and a plurality of second vertical ribs 28b (see FIGS. 13 and 14) formed on the outboard side surface of the extension portion 13. As illustrated in FIG. 15, the plurality of first vertical ribs 28a may extend vertically to a bottom surface of the mounting portion 27 on the inboard side surface of the extension portion 13. As illustrated in FIGS. 13 and 14, the plurality of second vertical ribs 28b may extend vertically to the bottom surface of the mounting portion 27 on the outboard side surface of the extension portion 13. As the mounting portion 27 of the extension portion 13 is supported by the plurality of vertical ribs 28a and 28b, mounting stiffness of the hood hinge may be significantly improved.

A bottom end of the front pillar upper 11b may be coupled to the top end of the front pillar lower 11a by using fasteners, welding, and/or the like.

Figure 5:
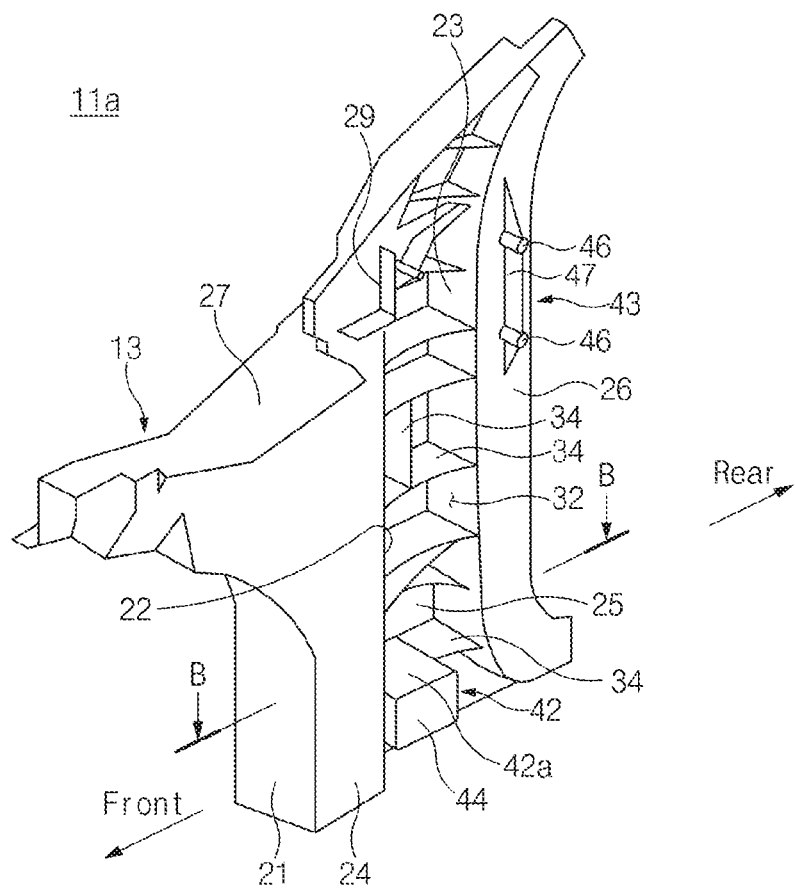
FIG. 5 illustrates a perspective view of a front pillar lower in a front pillar structure for a vehicle according to an exemplary embodiment of the present disclosure.
Figure 6:
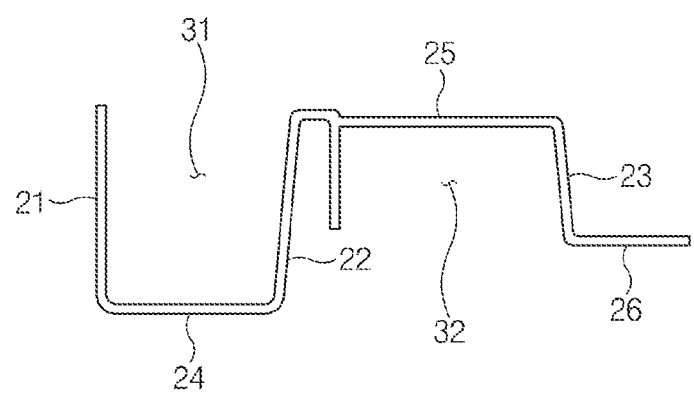
FIG. 6 illustrates a cross-sectional view taken along line B-B of FIG. 5.

Referring to FIGS. 5 to 8, the front pillar lower 11a may include a front wall 21 facing the front of the vehicle, a rear wall 23 facing the rear of the vehicle, a center wall 22 located between the front wall 21 and the rear wall 23, a first sidewall 24 connecting the front wall 21 and the center wall 22, and a second sidewall 25 connecting the center wall 22 and the rear wall 23. The first sidewall 24 and the second sidewall 25 may be parallel to each other. The first sidewall 24 may be recessed toward the interior space of the vehicle, and the second sidewall 25 may protrude toward the exterior space of the vehicle. As illustrated in FIG. 6, the front pillar lower 11a may have an S-shaped cross section.

The extension portion 13 may extend from the front wall 21 of the front pillar lower 11a toward the front of the vehicle, and may be integrally formed with the front top portion of the front pillar lower 11a so that the extension portion 13 and the front pillar lower 11a may be formed as a unitary one-piece structure. A cross-sectional area of the extension portion 13 may gradually increase from the front end of the extension portion 13 to the rear end of the extension portion 13 (i.e., the front wall 21 of the front pillar lower 11a), so that a load transmitted from the fender member 12 may be uniformly distributed and stably supported. In particular, the extension portion 13 may have a tapered surface 13a formed on a bottom surface thereof, and the tapered surface 13a may be curved.

Figure 8:
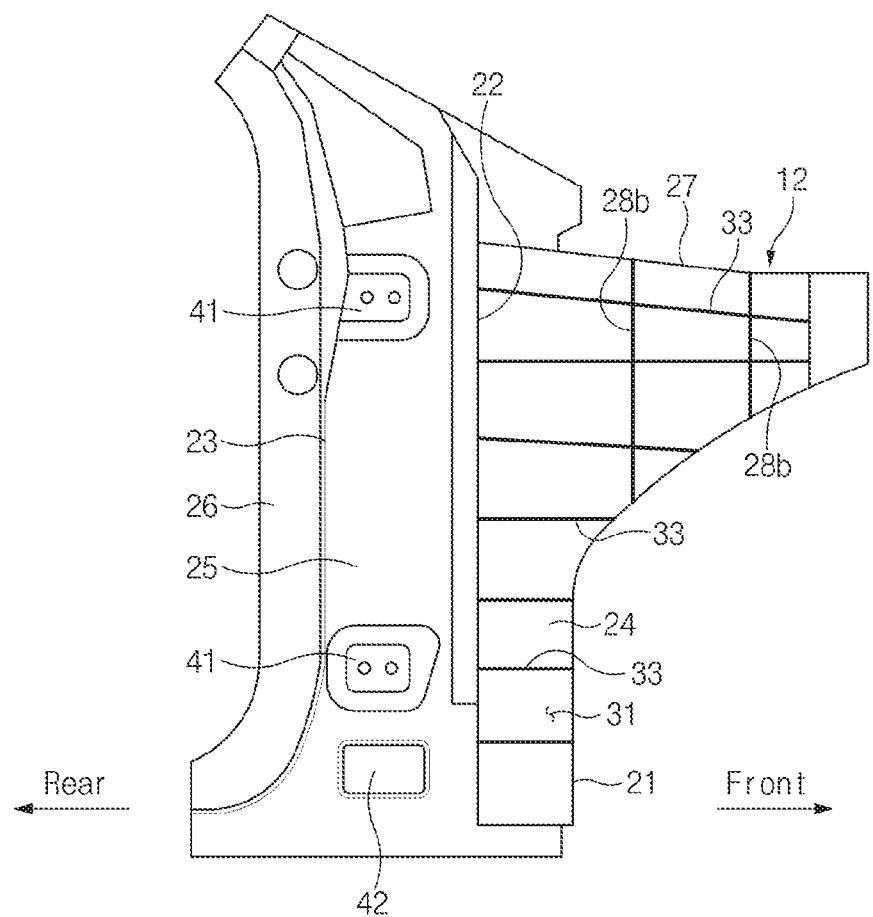
FIG. 8 illustrates a right-side view of the front pillar lower of FIG. 5.

The front pillar lower 11a may include a first cavity 31 defined by the front wall 21, the first sidewall 24, the center wall 22, and the extension portion 13, and the first cavity 31 may be opened to the exterior space of the vehicle. Referring to FIG. 8, a plurality of first reinforcing ribs 33 may be formed in the first cavity 31, and the plurality of first reinforcing ribs 33 may extend horizontally or obliquely among the front wall 21, the first sidewall 24, the center wall 22, and the extension portion 13.

Figure 16:
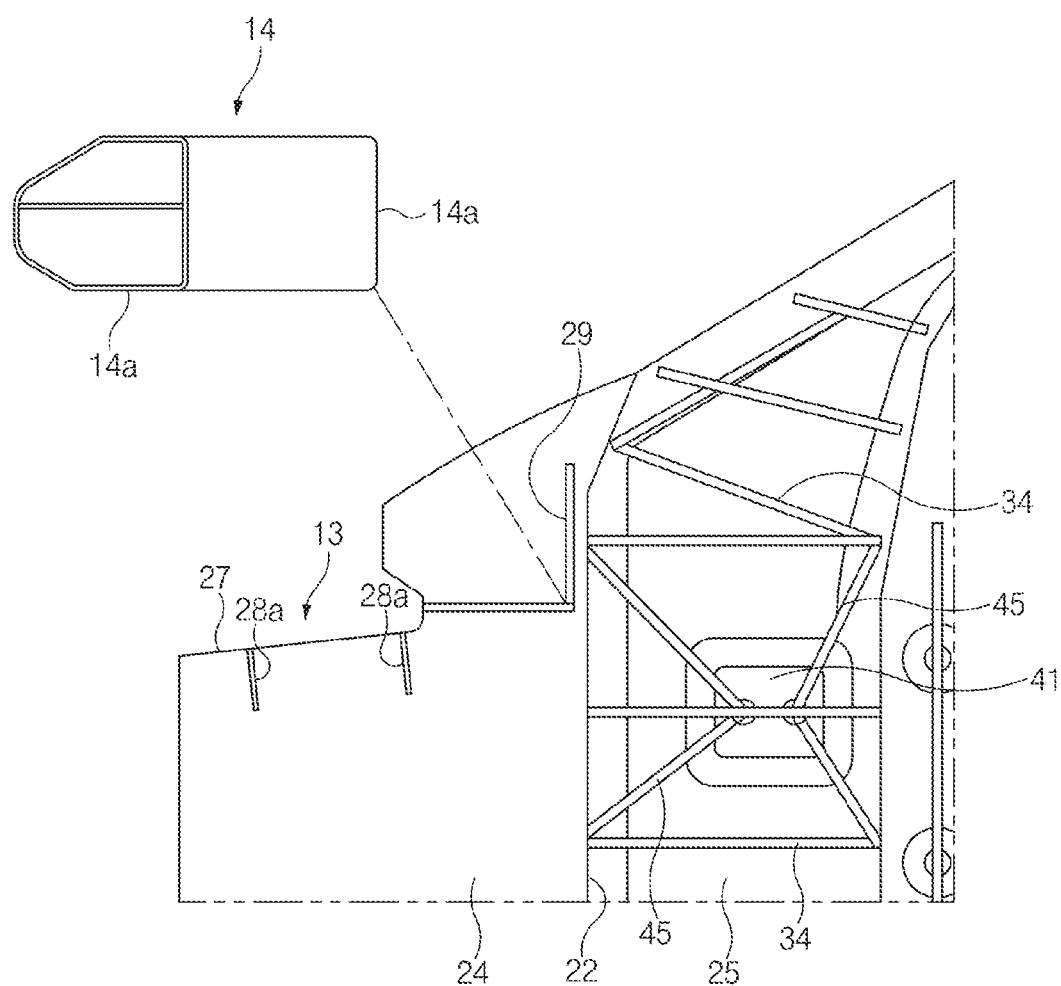
FIG. 16 illustrates a perspective view of a mounting rib of a front pillar lower and a cowl member in a front pillar structure for a vehicle according to an exemplary embodiment of the present disclosure.
Figure 17:
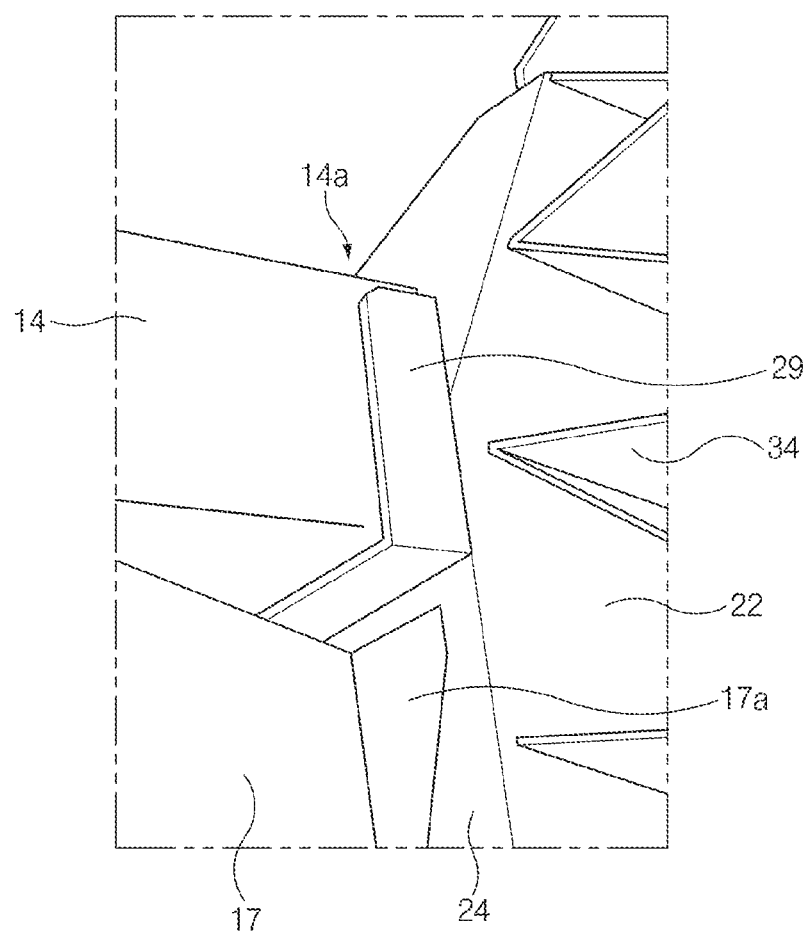
FIG. 17 illustrates a state in which an end portion of a cowl member is mounted on a mounting rib of a front pillar lower.
Figure 18:
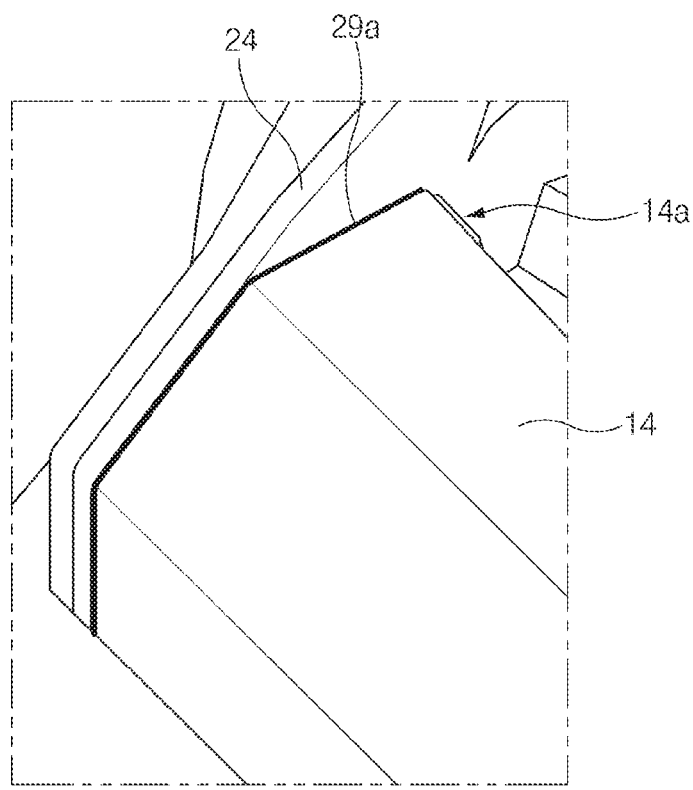
FIG. 18 illustrates a state in which an end portion of a cowl member is welded to a front pillar lower.

The first sidewall 24 may have an inboard side surface facing the interior space of the vehicle, and an outboard side surface facing the exterior space of the vehicle. Referring to FIG. 16, a mounting rib 29 may be formed on the inboard side surface of the first sidewall 24, and each end portion 14a of a cowl member 14 may be mounted on the mounting rib 29. The mounting rib 29 may be formed on an upper portion of the first sidewall 24. The mounting rib 29 may have an L-shaped cross section, and bottom and rear surfaces of the cowl member 14 may be seated on the mounting rib 29 so that the bottom and rear surfaces of the cowl member 14 may be coupled to the mounting rib 29 by butt welding and/or the like. Top and front surfaces of the cowl member 14 may be coupled to the inboard side surface of the first sidewall 24 by MIG welding 29a and/or the like. In this manner, each end portion 14a of the cowl member 14 may be firmly mounted on the front pillar lower 11a through the mounting rib 29.

The front pillar lower 11a may include a second cavity 32 defined by the center wall 22, the second sidewall 25, and the rear wall 23, and the second cavity 32 may be opened to the interior space of the vehicle. Referring to FIG. 5, a plurality of second reinforcing ribs 34 may be formed in the second cavity 32, and the plurality of second reinforcing ribs 34 may extend vertically, horizontally, or obliquely.

Figure 12:
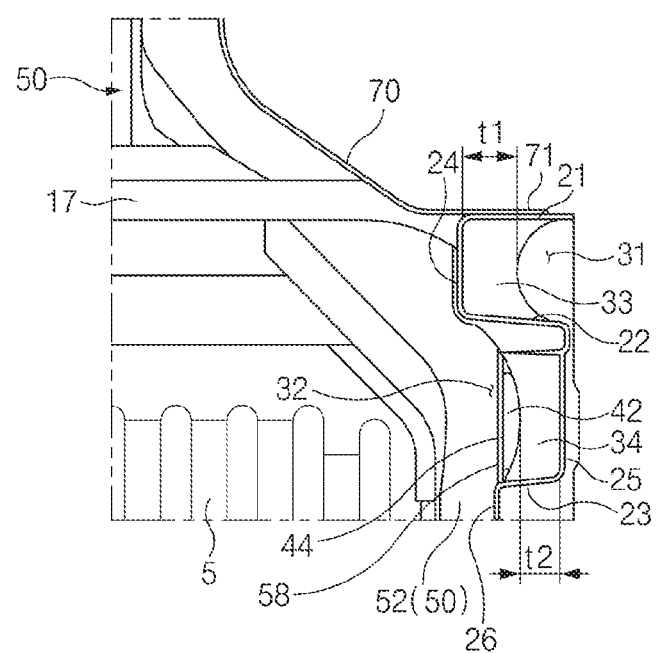
FIG. 12 illustrates a cross-sectional view taken along line E-E of FIG. 10.

Referring to FIG. 12, the plurality of first reinforcing ribs 33 and the plurality of second reinforcing ribs 34 may have the same width, so that the front pillar lower 11a may maintain the same load path.

Figure 7:
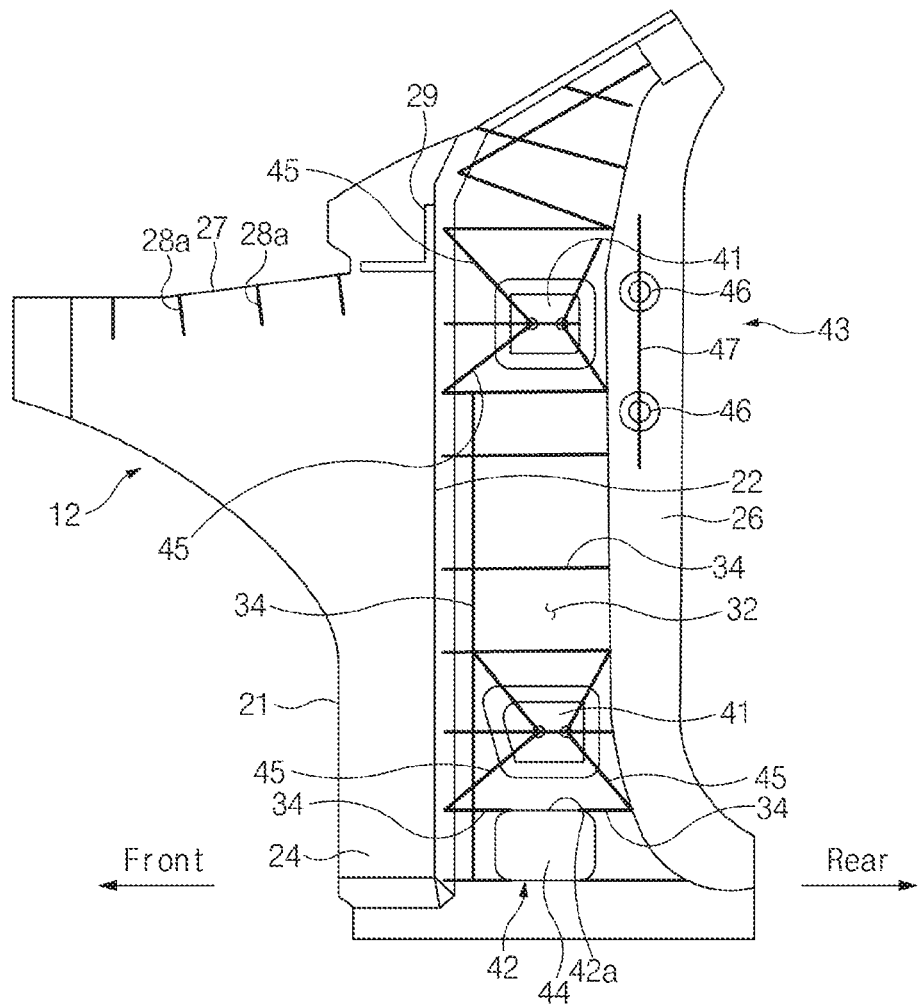
FIG. 7 illustrates a left-side view of the front pillar lower of FIG. 5.

The second sidewall 25 may have an inboard side surface facing the interior space of the vehicle, and an outboard side surface facing the exterior space of the vehicle. The second sidewall 25 may have a first mounting portion 41 for mounting a hinge of a vehicle door, and the first mounting portion 41 may protrude from the outboard side surface of the second sidewall 25 toward the exterior space of the vehicle as illustrated in FIG. 13. Accordingly, the first mounting portion 41 may be a recessed structure from the inboard side surface of the second sidewall 25. Referring to FIG. 7, a plurality of support ribs 45 may be formed on the inboard side surface of the second sidewall 25 to support the first mounting portion 41, and the plurality of support ribs 45 may intersect in the recessed portion of the first mounting portion 41.

The second sidewall 25 may have a second mounting portion 42. The second mounting portion 42 may protrude from the inboard side surface of the second sidewall 25 toward the interior space of the vehicle, and be a recessed structure from the outboard side surface of the second sidewall 25. The second mounting portion 42 may have a mounting surface 44 to which a rear flange 58 of a connection member 50 is coupled by welding, using fasteners, and/or the like. Referring to FIGS. 5 and 7, a top surface 42a of the second mounting portion 42 may be flush with the adjacent reinforcing rib 34 and the second mounting portion 42 may be firmly supported on the second sidewall 25 by the reinforcing rib 34 located on the same line, so that support stiffness of the second mounting portion 42 may be significantly improved.

In addition, the front pillar lower 11a may further include a third sidewall 26 extending from the rear wall 23 toward the rear of the vehicle. The third sidewall 26 may have an inboard side surface facing the interior space of the vehicle, and an outboard side surface facing the exterior space of the vehicle. Referring to FIG. 5, the third sidewall 26 may have a third mounting portion 43 on which an end portion of a cowl crossbar (not shown) is mounted, and the third mounting portion 43 may include a plurality of bosses 46 and a rib 47 vertically connecting the bosses 46. In particular, the third mounting portion 43 may be formed on the inboard side surface of the third sidewall 26.

As described above, the front pillar lower 11a may have the S-shaped cross-sectional structure which facilitates absorption and transmission of impact energy by the first cavity 31 and the first reinforcing ribs 33 on the front side of the center wall 22, and protect a passenger compartment safely by implementing a rigid cross-sectional structure by the second cavity 32 and the second reinforcing ribs 34 on the rear side of the center wall 22.

Figure 9:
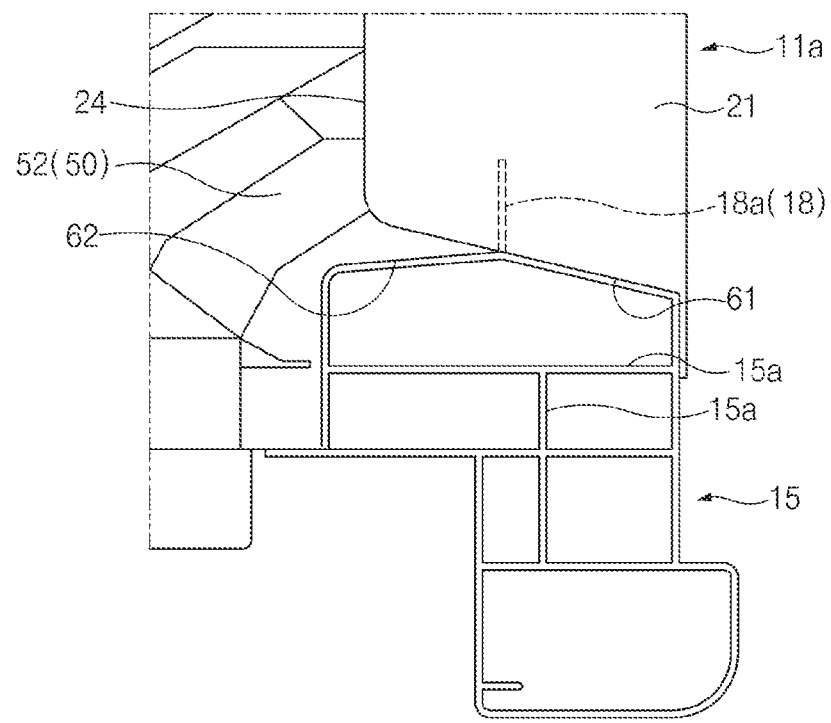
FIG. 9 illustrates a view in a direction of arrow C of FIG. 3, from which an outer member is removed.
Figure 11:
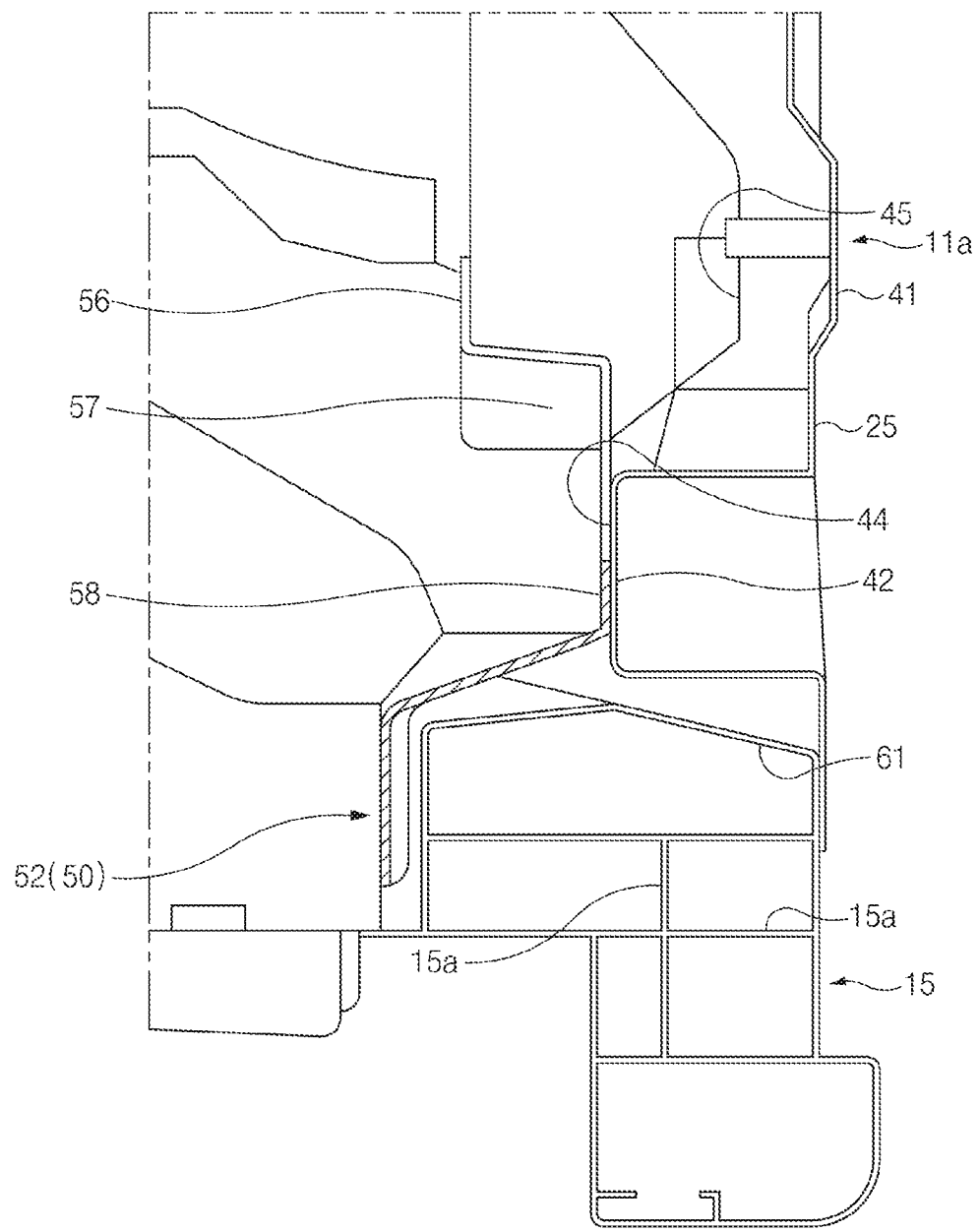
FIG. 11 illustrates a cross-sectional view taken along line D-D of FIG. 10.

Referring to FIGS. 1 and 2, a pair of side sills 15 may be disposed on both sides of a floor panel 5, and each side sill 15 may be coupled to the front pillar lower 11a by using fasteners, welding, and/or the like. As illustrated in FIG. 9, each side sill 15 may have a plurality of reinforcing ribs 15a, and the plurality of reinforcing ribs 15a may extend in a longitudinal direction of the side sill 15. Referring to FIGS. 9 and 11, the front pillar lower 11a may have a first seated portion 61 which is seated on a top surface of a front end of the side sill 15, and the first seated portion 61 may be formed on a bottom surface of the front pillar lower 11a.

Figure 10:
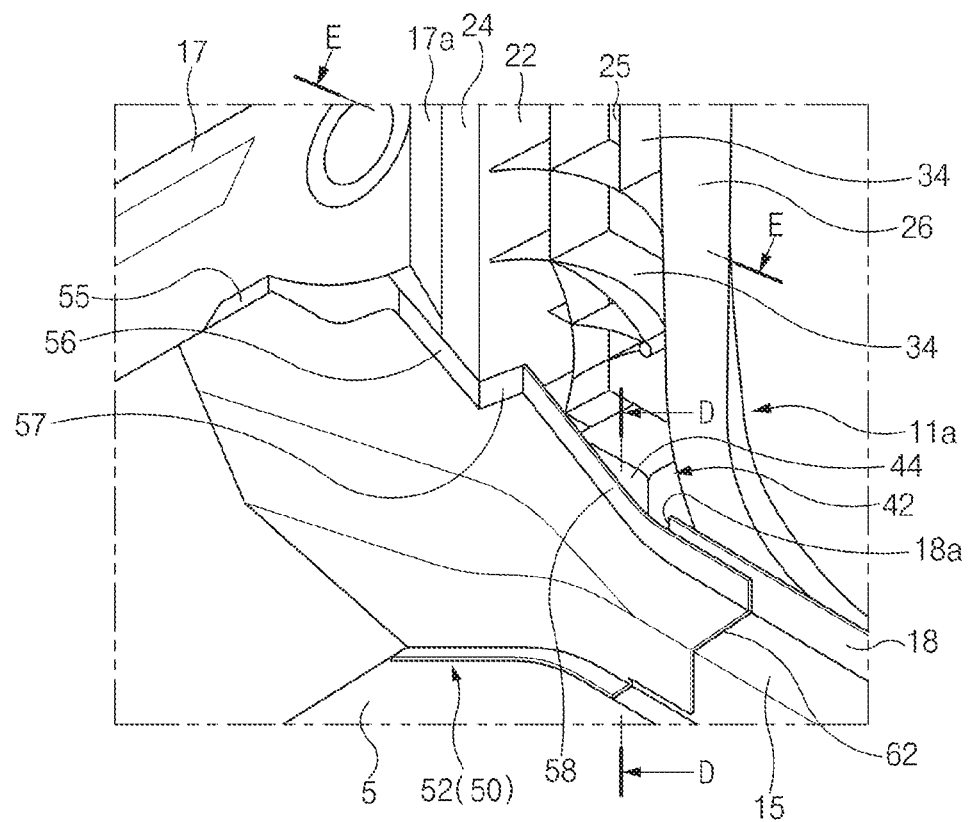
FIG. 10 illustrates a front pillar structure for a vehicle according to an exemplary embodiment of the present disclosure, in which a second connecting portion of a connection member, a front pillar lower, and a side sill are coupled.

Referring to FIGS. 9 and 10, each side sill 15 may have a flange 18 protruding upwardly from a top end thereof. The flange 18 of the side sill 15 may be coupled to a bottom end of the front pillar lower 11a as illustrated in FIG. 10. In particular, the flange 18 of the side sill 15 may be coupled to the third sidewall 26 of the front pillar lower 11a by welding, using fasteners, and/or the like. As the side sill 15 is coupled to the third sidewall 26 of the front pillar lower 11a, the side sill 15 may be mounted stepwise to the front pillar lower 11a in a height direction of the vehicle, so that the front pillar lower 11a may stably support a load in the height direction of the vehicle.

Referring to FIGS. 3 and 10, a front end 18a of the flange 18 of the side sill 15 may be stopped by the second mounting portion 42 so that the position of the side sill 15 may be regulated or determined.

Referring to FIG. 1, a dash panel 17 may be mounted between the pair of front pillars 11. Referring to FIG. 10, the dash panel 17 may have flanges 17a located on both left and right edges thereof, and each flange 17a of the dash panel 17 may be coupled to the inboard side surface of the first sidewall 24 of the front pillar lower 11a by welding, using fasteners, and/or the like. The cowl member 14 may be disposed on a top end of the dash panel 17, and each end portion 14a of the cowl member 14 may be mounted on the mounting rib 29 of the front pillar lower 11a.

Referring to FIGS. 1 and 2, the front end of the side sill 15 may be connected to a rear end of a front side member 16 by the connection member 50. That is, the connection member 50 may connect the rear end of the front side member 16 and the front end of the side sill 15, and the connection member 50 may be coupled to the bottom portion of the front pillar lower 11a.

The connection member 50 may have a first connecting portion 51 coupled to the rear end of the front side member 16, and a second connecting portion 52 coupled to the front end of the side sill 15. Referring to FIG. 2, the first connecting portion 51 may have a receiving space 53 in which the rear end of the front side member 16 is received, and the receiving space 53 may have a support wall 54 by which a rear end surface 16a of the front side member 16 is supported. Referring to FIG. 9, the second connecting portion 52 may have a second seated portion 62 which is seated on the front end of the side sill 15, and the second seated portion 62 may be formed on a bottom surface of the second connecting portion 52.

Referring to FIG. 10, the second connecting portion 52 may have stepwise flanges 55, 56, 57, and 58 coupled to the dash panel 17, the front pillar lower 11a, and the side sill 15. The stepwise flanges 55, 56, 57, and 58 may include a front flange 55 extending in the width direction of the vehicle, a first intermediate flange 56 orthogonal to the front flange 55, a second intermediate flange 57 orthogonal to the first intermediate flange 56, and the rear flange 58 orthogonal to the second intermediate flange 57. The first intermediate flange 56 and the rear flange 58 may extend in a longitudinal direction of the vehicle. The first intermediate flange 56 and the rear flange 58 may be parallel to each other, and the second intermediate flange 57 may be orthogonal to the first intermediate flange 56 and the rear flange 58. In this manner, the flanges 55, 56, 57, and 58 of the second connecting portion 52 may form a stepwise structure.

The front flange 55 may be coupled to the dash panel 17 by welding, using fasteners, and/or the like, and the first intermediate flange 56 may be coupled to the first sidewall 24 and the center wall 22 of the front pillar lower 11a by welding, using fasteners, and/or the like. The second intermediate flange 57 may be coupled to the center wall 22 of the front pillar lower 11a by welding, using fasteners, and/or the like, and the rear flange 58 may be coupled to the second mounting portion 42 of the front pillar lower 11a and the flange 18 of the side sill 15 by welding, using fasteners, and/or the like. As the stepwise flanges 55, 56, 57, and 58 of the second connecting portion 52 are coupled to the dash panel 17, the front pillar lower 11a, and the side sill 15 in a stepwise manner along the longitudinal direction of the vehicle, the connection member 50 may firmly support shear and compressive loads.

Referring to FIG. 9, the first seated portion 61 of the front pillar lower 11a and the second seated portion 62 of the connection member 50 may be symmetrically seated on and coupled to the front end of the side sill 15, the front pillar lower 11a and the connection member 50 may be firmly supported to the front end of the side sill 15. The first seated portion 61 of the front pillar lower 11a may be seated on and coupled to the outboard side of the front end of the side sill 15, and the second seated portion 62 of the second connecting portion 52 of the connection member 50 may be seated on and coupled to the inboard side of the front end of the side sill 15.

Referring to FIGS. 12 and 13, an outer member 70 may be attached to the outboard side of the connection member 50 to cover a portion of the inboard side of the connection member 50. The outer member 70 may have a coupling portion 71 having a predetermined area, and the coupling portion 71 may be bent at a predetermined angle with respect to a rear end of the outer member 70. The coupling portion 71 of the outer member 70 may be matched and coupled to the front wall 21 of the front pillar lower 11a by welding, using fasteners, and/or the like. Thus, this may firmly support a compressive load applied to the front wall 21 of the front pillar lower 11a in the event of a frontal impact or an oblique impact of the vehicle.

Figure 4:
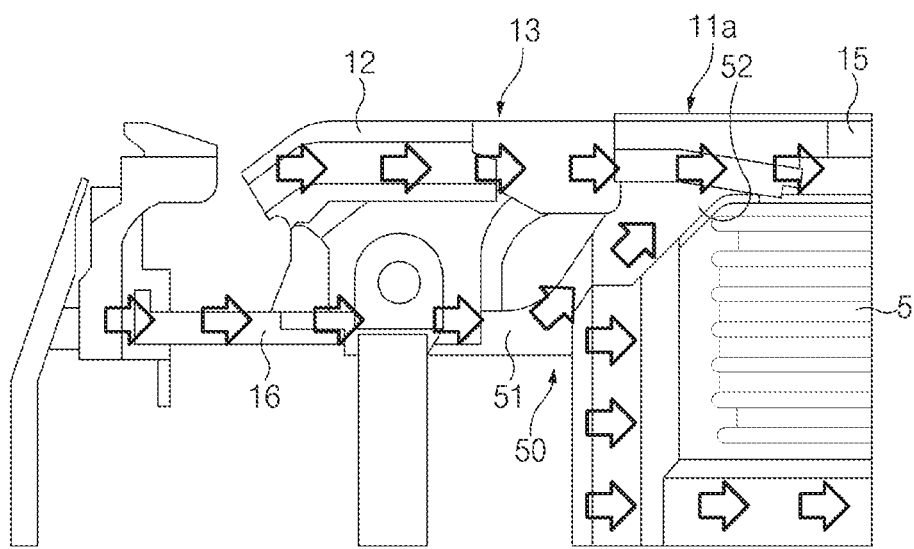
FIG. 4 illustrates a plan view of a right portion of a vehicle body in a front pillar structure for a vehicle according to an exemplary embodiment of the present disclosure.

According to the above-described exemplary embodiment of the present disclosure, as illustrated in FIG. 4, the impact energy during the frontal impact or the oblique impact of the vehicle may be transmitted to the side sill 15 and/or the dash panel 17 through the front side member 16 and the connection member 50, and be transmitted to the side sill 15 and/or the dash panel 17 through the fender member 12, the extension portion 13, and the front pillar lower 11a. That is, the impact energy may be distributed or absorbed through various load paths.

In particular, the front pillar lower 11a may have the S-shaped cross-sectional structure, thereby facilitating the absorption and transmission of the impact energy on the front side of the center wall 22, and protecting the passenger compartment safely on the rear side of the center wall 22.

In addition, the front pillar lower 11a may have the plurality of reinforcing ribs 33 and 34 and the extension portion 13 integrally formed as a unitary one-piece structure, thereby reducing the number of components compared to the related art. Thus, the weight and manufacturing cost may be significantly reduced.

As set forth above, according to exemplary embodiments of the present disclosure, impact energy in the event of a frontal impact or an oblique impact of a vehicle may be transmitted to the side sill and/or the dash panel through the front side member and the connection member, and be transmitted to the side sill and/or the dash panel through the fender member, the extension portion, and the front pillar lower. That is, the impact energy may be distributed or absorbed through various load paths.

According to exemplary embodiments of the present disclosure, the front pillar lower may have the S-shaped cross-sectional structure, thereby facilitating the absorption and transmission of the impact energy on the front side of the center wall, and protecting the passenger compartment safely on the rear side of the center wall.

According to exemplary embodiments of the present disclosure, the front pillar lower may have the plurality of reinforcing ribs and the extension portion integrally formed as a unitary one-piece structure, thereby reducing the number of components compared to the related art. Thus, the weight and manufacturing cost of the front pillar structure may be significantly reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A front pillar structure for a vehicle, the front pillar structure comprising:
    a front pillar including a front pillar lower extending vertically and a front pillar upper extending obliquely from the front pillar lower, wherein the front pillar lower has an S-shaped cross section; and
    a connection member coupled to a bottom end of the front pillar lower and connecting a front side member and a side sill, wherein the connection member has stepwise flanges coupled to the bottom end of the front pillar lower, wherein the front side member extends along a longitudinal direction of the vehicle.

2. The front pillar structure according to claim 1, wherein the front pillar lower comprises a first sidewall that is recessed toward an interior space of the vehicle and a second sidewall that protrudes toward an exterior space of the vehicle.

3. The front pillar structure according to claim 2, wherein the front pillar lower further comprises a front wall facing a front of the vehicle, a rear wall facing a rear of the vehicle, and a center wall located between the front wall and the rear wall;
    wherein the first sidewall connects the front wall and the center wall; and
    wherein the second sidewall connects the center wall and the rear wall.

4. The front pillar structure according to claim 3, wherein the front pillar lower includes a first cavity that is defined by front wall, the first sidewall, and the center wall, and wherein a plurality of first reinforcing ribs are provided in the first cavity.

5. The front pillar structure according to claim 4, wherein the front pillar lower includes a second cavity that is defined by the center wall, the second sidewall, and the rear wall, and wherein a plurality of second reinforcing ribs are provided in the second cavity.

6. The front pillar structure according to claim 3, wherein the front pillar lower includes a second cavity that is defined by the center wall, the second sidewall, and the rear wall, and wherein a plurality of second reinforcing ribs are provided in the second cavity.

7. The front pillar structure according to claim 1, wherein the front pillar lower comprises a first mounting portion that protrudes from an outboard side surface of the front pillar lower toward an exterior space of the vehicle.

8. The front pillar structure according to claim 1, wherein the front pillar lower comprises a second mounting portion to which the connection member is coupled.

9. The front pillar structure according to claim 1, wherein the front pillar lower comprises a third mounting portion that includes a plurality of bosses and a rib vertically connecting the bosses.

10. The front pillar structure according to claim 1, wherein the stepwise flanges of the connection member include a front flange extending in a width direction of the vehicle, a first intermediate flange that is orthogonal to the front flange, a second intermediate flange that is orthogonal to the first intermediate flange, and a rear flange that is orthogonal to the second intermediate flange.

11. The front pillar structure according to claim 10, wherein the first intermediate flange and the rear flange extend in the longitudinal direction of the vehicle;
    wherein the first intermediate flange and the rear flange are parallel to each other; and
    wherein the second intermediate flange is orthogonal to the first intermediate flange and the rear flange.

12. The front pillar structure according to claim 1, wherein the front pillar lower comprises an extension portion extending toward a front of the vehicle, the extension portion being coupled to a fender member.

13. The front pillar structure according to claim 12, wherein a cross-sectional area of the extension portion gradually increases from a front end of the extension portion to a rear end of the extension portion.

14. The front pillar structure according to claim 12, wherein the extension portion has a mounting portion on a top surface thereof, the mounting portion being supported by a plurality of vertical ribs.

15. The front pillar structure according to claim 1, wherein the front pillar lower has a mounting rib on which a cowl member is mounted, the mounting rib having an L-shaped cross section.

16. The front pillar structure according to claim 1, wherein an outer member is attached to an outboard side of the connection member and a rear end of the outer member is coupled to a front wall of the front pillar lower.

17. A front pillar structure for a vehicle, the front pillar structure comprising:
    a front pillar including a front pillar lower extending vertically and a front pillar upper extending obliquely from the front pillar lower, wherein the front pillar lower has an S-shaped cross section, wherein the front pillar lower comprises a third mounting portion that includes a plurality of bosses and a rib vertically connecting the bosses; and
    a connection member coupled to a bottom end of the front pillar lower and connecting a front side member and a side sill, wherein the connection member has stepwise flanges coupled to the bottom end of the front pillar lower.

18. A front pillar structure for a vehicle, the front pillar structure comprising:
    a front pillar including a front pillar lower extending vertically and a front pillar upper extending obliquely from the front pillar lower, wherein the front pillar lower has an S-shaped cross section, wherein the front pillar lower comprises an extension portion extending toward a front of the vehicle, the extension portion being coupled to a fender member; and
    a connection member coupled to a bottom end of the front pillar lower and connecting a front side member and a side sill, wherein the connection member has stepwise flanges coupled to the bottom end of the front pillar lower.

19. The front pillar structure according to claim 18, wherein a cross-sectional area of the extension portion gradually increases from a front end of the extension portion to a rear end of the extension portion.

20. The front pillar structure according to claim 18, wherein the extension portion has a mounting portion on a top surface thereof, the mounting portion being supported by a plurality of vertical ribs.

\* \* \* \* \*

UNITED STATES PATENT AND TRADEMARK OFFICE
CERTIFICATE OF CORRECTION

| | | |
|---|---|---|
| PATENT NO. | : 11,260,913 B2 | Page 1 of 1 |
| APPLICATION NO. | : 16/588358 | |
| DATED | : March 1, 2022 | |
| INVENTOR(S) | : Hong et al. | |

It is certified that error appears in the above-identified patent and that said Letters Patent is hereby corrected as shown below:

On the Title Page

Item [73], delete "Cornoration" and insert --Corporation--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*